US012076875B2

(12) United States Patent
Tsai

(10) Patent No.: US 12,076,875 B2
(45) Date of Patent: Sep. 3, 2024

(54) INTERCHANGEABLE CUTLERY SYSTEM

(71) Applicants: Havel's, LLC, Cincinnati, OH (US); Gigand Company, LTD, Taipei Hsien (TW)

(72) Inventor: Wu Hsien Tsai, Dist Of New Taipei (TW)

(73) Assignees: Havel's Inc., Cincinnati, OH (US); Gigand Company, LTD, Taipei Hsien (TW)

( * ) Notice: Subject to any disclaimer, the term of this patent is extended or adjusted under 35 U.S.C. 154(b) by 0 days.

(21) Appl. No.: 17/663,615

(22) Filed: May 16, 2022

(65) Prior Publication Data

US 2022/0388187 A1 Dec. 8, 2022

Related U.S. Application Data

(62) Division of application No. 16/244,266, filed on Jan. 10, 2019, now Pat. No. 11,370,132.

(60) Provisional application No. 62/632,092, filed on Feb. 19, 2018, provisional application No. 62/615,693, filed on Jan. 10, 2018.

(51) Int. Cl.

| | |
|---|---|
| ***B26B 5/00*** | (2006.01) |
| ***B26B 3/03*** | (2006.01) |
| ***B26B 9/00*** | (2006.01) |
| ***B26B 9/02*** | (2006.01) |

(52) U.S. Cl.

CPC .................. *B26B 5/00* (2013.01); *B26B 3/03* (2013.01); *B26B 9/00* (2013.01); *B26B 9/02* (2013.01)

(58) Field of Classification Search

CPC .... B26B 3/00; B26B 3/03; B26B 5/00; B26B 9/00; B26B 9/02

USPC ........................................... 30/329–340, 342

See application file for complete search history.

(56) References Cited

U.S. PATENT DOCUMENTS

| | | | |
|---|---|---|---|
| 3,863,339 | A | 2/1975 | Reaney |
| 3,900,950 | A | 8/1975 | Collins |
| 3,924,493 | A | 12/1975 | Penner |
| 4,233,737 | A | 11/1980 | Poehlmann |
| 4,292,738 | A | 10/1981 | Osada |
| 5,774,994 | A | 7/1998 | Stein |
| 5,862,596 | A | 1/1999 | Chung |
| 6,055,733 | A | 5/2000 | Chen |
| 6,085,424 | A | 7/2000 | Mai |
| 6,336,731 | B1 | 1/2002 | Chien |
| 6,367,854 | B1 | 4/2002 | Chou |
| 6,675,483 | B2 | 1/2004 | Bond |
| 6,694,578 | B1 | 2/2004 | Nicoll |
| 7,621,051 | B2 | 11/2009 | Ping |

(Continued)

OTHER PUBLICATIONS

Havel's Blades and Accessories, in public use and on sale in the US more than one year prior to Jan. 10, 2019, 3 pages.

(Continued)

*Primary Examiner* — Jason Daniel Prone

(74) *Attorney, Agent, or Firm* — Wood Herron & Evans LLP

(57) ABSTRACT

An interchangeable cutlery system has a blade handle incorporating a quick-change blade mechanism. A selected one of a plurality of blades can be removably attached to the handle via the mechanism. The plurality of blades include a filet knife blade, a back-serrated fillet knife blade, a clip point knife blade, a gut hook knife blade, a saw blade, a fish scaler, and a large bush craft blade.

11 Claims, 15 Drawing Sheets

(56) References Cited

U.S. PATENT DOCUMENTS

| | | | |
|---|---|---|---|
| 8,191,267 | B2 | 6/2012 | Patel |
| 8,205,341 | B2 | 6/2012 | Rosso |
| 8,419,510 | B2 | 4/2013 | Neal |
| 8,567,072 | B2 | 10/2013 | Yi |
| D847,938 | S | 5/2019 | Tsai |
| 10,464,223 | B2 | 11/2019 | Scalise |
| 11,370,132 | B2 | 6/2022 | Tsai |
| 2003/0024126 | A1 | 2/2003 | Liu |
| 2005/0252010 | A1 | 11/2005 | Freeman |
| 2006/0053639 | A1 | 3/2006 | Nakanishi |
| 2006/0117570 | A1 | 6/2006 | Pool |
| 2007/0044323 | A1 | 3/2007 | Chao |
| 2007/0204471 | A1 | 9/2007 | Castagna |
| 2007/0256310 | A1 | 11/2007 | Pool |
| 2008/0276468 | A1 | 11/2008 | Norling |
| 2009/0217536 | A1 | 9/2009 | Medhurst |
| 2010/0107424 | A1 | 5/2010 | Garcia |
| 2010/0192382 | A1 | 8/2010 | Burch |
| 2010/0263219 | A1 | 10/2010 | Kempker |
| 2011/0030225 | A1 | 2/2011 | Wang |
| 2012/0073142 | A1 | 3/2012 | Zeng |
| 2014/0345147 | A1 | 11/2014 | Frazer |
| 2017/0225353 | A1 | 8/2017 | Wang |
| 2017/0348863 | A1 | 12/2017 | Kommer et al. |
| 2019/0176349 | A1 | 6/2019 | Hansen |
| 2020/0101633 | A1 | 4/2020 | Halucha |
| 2020/0391397 | A1* | 12/2020 | Cauley, Jr. ................ B26B 5/00 |
| 2022/0126465 | A1* | 4/2022 | Halucha .................... B26B 5/00 |
| 2023/0001591 | A1* | 1/2023 | Okamura .................. B26B 5/00 |
| 2023/0173696 | A1* | 6/2023 | Bruhns ..................... B26B 9/00 30/329 |
| 2023/0256586 | A1* | 8/2023 | Kim ......................... B25G 3/18 81/489 |

OTHER PUBLICATIONS

Havalon Hydra Red, in public use and on sale in the US more than one year prior to Jan. 10, 2019, 9 pages.

Browning Speed Load Knives, in public use and on sale in the US more than one year prior to Jan. 10, 2019, 6 pages.

* cited by examiner

INTERCHANGEABLE CUTLERY SYSTEM

RELATED APPLICATIONS

This application is a divisional of U.S. Non-provisional application Ser. No. 16/244,266 filed Jan. 10, 2019, now U.S. Pat. No. 11,370,132, which application claims the priority benefit of U.S. Provisional Patent Application No. 62/615,693 filed Jan. 10, 2018 and of U.S. Provisional Patent Application No. 62/632,092 filed Feb. 19, 2018, all of which are hereby incorporated by reference herein as if fully set forth in their entirety.

FIELD OF THE INVENTION

This invention relates generally to cutlery, and more particularly to an interchangeable cutlery system with a quick-change blade mechanism.

BACKGROUND OF THE INVENTION

Interchangeable cutlery systems wherein multiple blades may be removable attached in seriatim to a single handle are known. Such systems allow different blade types to be employed with a single handle, as well as allow replacing a dull blade with a fresh sharp blade.

Various mechanisms have heretofore been proposed for removably attaching a knife blade to a knife handle. Nevertheless, further improvement is desired.

SUMMARY OF THE INVENTION

In one aspect, an interchangeable cutlery system comprises a blade handle incorporating a quick-change blade mechanism, and a plurality of blades removably attachable to the handle via the mechanism, wherein the plurality of blades are selected from a group consisting of a filet knife blade, a back-serrated fillet knife blade, a clip point knife blade, a gut hook knife blade, a saw blade, a fish scaler, a large bush craft blade, and multiple lengths thereof.

The mechanism of the system can comprise a spring mounted in the handle and deflectable generally perpendicular to a plane of the handle, a spring stud mounted on the spring, a release button mounted on the spring, and an aperture in a proximal end of the blade. Sliding the proximal end of the blade into the handle while pressing the release button to deflect the spring permits the blade to be inserted into the handle. Releasing the release button once the aperture is aligned with the spring stud allows the spring to bias the spring stud into the aperture to attach the blade to the handle. Pressing the release button deflects the spring thereby moving the spring stud out of the aperture at which time the proximal end of the blade can be slid out of the handle to thereby detach the blade from the handle.

The system can further include a blade fitment plate, a first portion of the plate mounted in the handle and a second portion of the plate extending out of a distal end of the handle. The spring can be mounted to the first portion of the plate. The aperture can be an elongated slot and the second portion of the plate can include an elongated protuberance which is closely and slidably received in the elongated slot. The slot can include a wider proximal portion and a narrower distal portion. The protuberance can include a first portion which can pass through the wider proximal portion of the slot but which cannot pass through the narrower distal portion of the slot, and a second portion, narrower than the first portion, that connects the first portion to the plate and which is closely and slidably received in the narrower distal portion of the slot. The proximal end of the blade can further include a recess therein spaced transversely from the elongated slot within a plane of the blade and the plate can further include a fitment stud which is received in the recess when the blade is attached to the handle. The spring can be a cantilever beam secured to the plate at a proximal end of the cantilever beam, the spring stud can be mounted to the beam at a distal end of the beam, and the release button can be mounted to the beam between the proximal end of the beam and the spring stud. The handle can include a first portion and a second portion removably attached to the first portion, wherein the fitment plate is secured to the second portion, and wherein the first portion includes a lock lever for locking the second portion to the first portion.

In another aspect, a bladed implement including a quick-change blade mechanism comprises a blade handle including a spring mounted in the handle and deflectable generally perpendicular to a plane of the handle, a spring stud mounted on the spring, a release button mounted on the spring, and a blade including an aperture in a proximal end of the blade. Sliding the proximal end of the blade into the handle while pressing the release button to deflect the spring permits the blade to be inserted into the handle. Releasing the release button once the aperture is aligned with the spring stud allows the spring to bias the spring stud into the aperture to attach the blade to the handle. Pressing the release button deflects the spring thereby moving the spring stud out of the aperture at which time the proximal end of the blade can be slid out of the handle to thereby detach the blade from the handle.

In another aspect, an interchangeable cutlery system comprises a knife handle incorporating a quick-change knife blade mechanism, and a plurality of knife blades removably attachable to the handle via the mechanism, wherein the plurality of blades are selected from a group consisting of filet, clip, and gut hook blades, and multiple lengths thereof.

The mechanism of the system can comprise a spring mounted in the handle and deflectable generally perpendicular to a plane of the handle, a spring stud mounted on the spring, a release button mounted on the spring, and an aperture in a proximal end of the blade. Sliding the proximal end of the blade into the handle deflects the spring by virtue of the blade acting upon the spring stud, or alternatively or in addition thereto, pressing the release button deflects the spring, until such time as the aperture is aligned with the spring stud whereupon the spring biases the spring stud into the aperture to attach the blade to the handle. Pressing the release button deflects the spring thereby moving the spring stud out of the aperture at which time the proximal end of the blade can be slid out of the handle to thereby detach the blade from the handle.

The system can further include a blade fitment plate, a first portion of the plate mounted in the handle and a second portion of the plate extending out of a distal end of the handle. The spring can be mounted to the first portion of the plate. The aperture can be an elongated slot and the second portion of the plate can include an elongated protuberance which is closely and slidably received in the elongated slot. The distal end of the blade can further include a recess therein spaced transversely from the elongated slot within a plane of the blade and the plate can further include a fitment stud which is received in the recess when the blade is attached to the handle. The spring can be a cantilever beam secured to the plate at a proximal end of the cantilever beam, the spring stud can be mounted to the beam at a distal end of the beam, and the release button can be mounted to the beam between the proximal end of the beam and the spring stud. The handle can include a first portion and a second portion removably attached to the first portion, wherein the fitment plate is secured to the second portion, and wherein the first portion includes a lock lever for locking the second portion to the first portion.

In another aspect, a knife including a quick-change knife blade mechanism comprises a knife handle including a spring mounted in the handle and deflectable generally perpendicular to a plane of the handle, a spring stud mounted on the spring, a release button mounted on the spring, and a knife blade including an aperture in a proximal end of the blade. Sliding the proximal end of the blade into the handle deflects the spring by virtue of the blade acting upon the spring stud, or alternatively or in addition thereto, pressing the release button deflects the spring, until such time as the aperture is aligned with the spring stud whereupon the spring biases the spring stud into the aperture to attach the blade to the handle. Pressing the release button deflects the spring thereby moving the spring stud out of the aperture at which time the proximal end of the blade can be slid out of the handle to thereby detach the blade from the handle.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
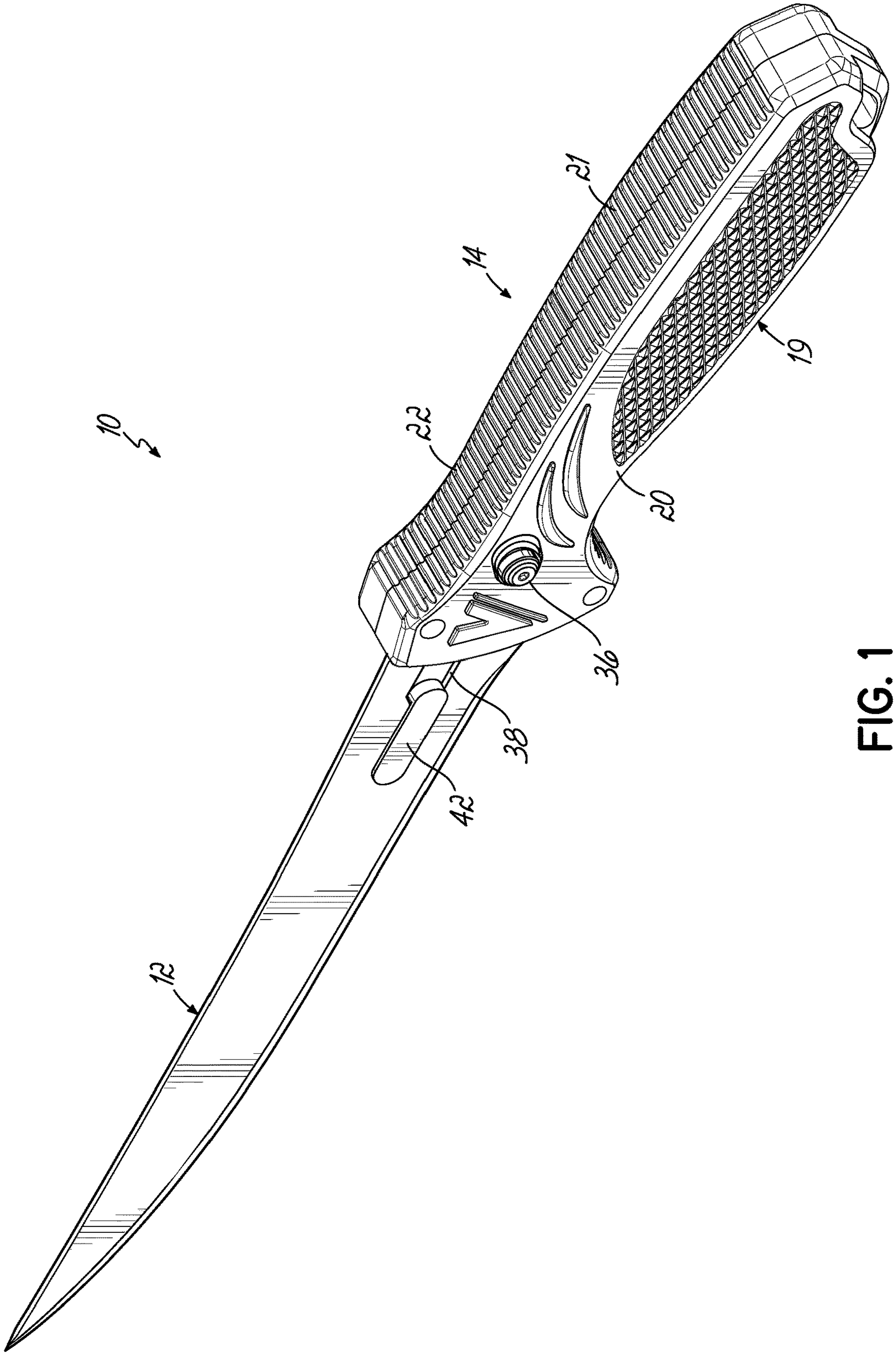
FIG. 1 is a rear top right perspective view of a knife according to the invention.
Figure 2:
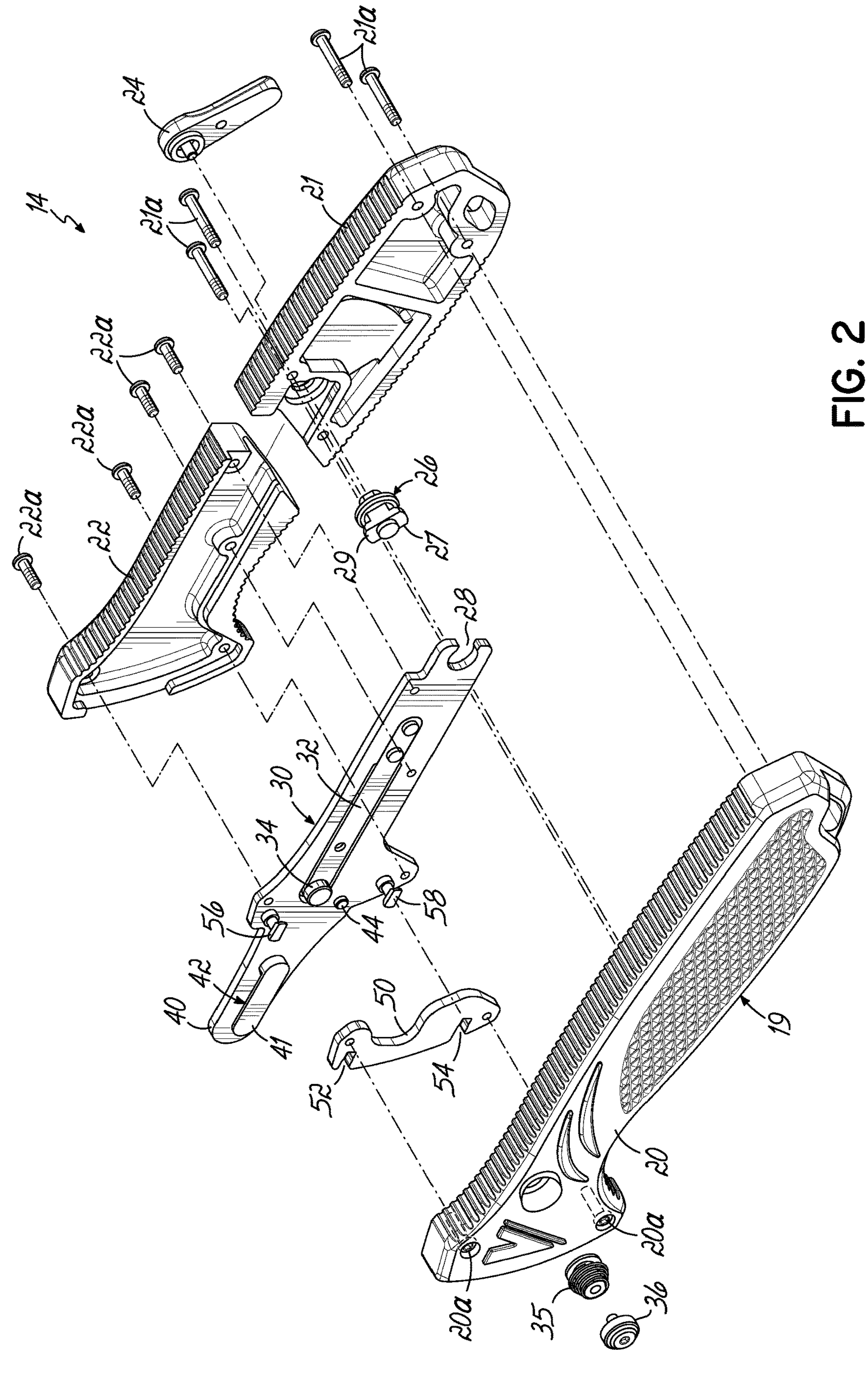
FIG. 2 is an exploded rear top right perspective view the knife handle of FIG. 1.
Figure 3A:
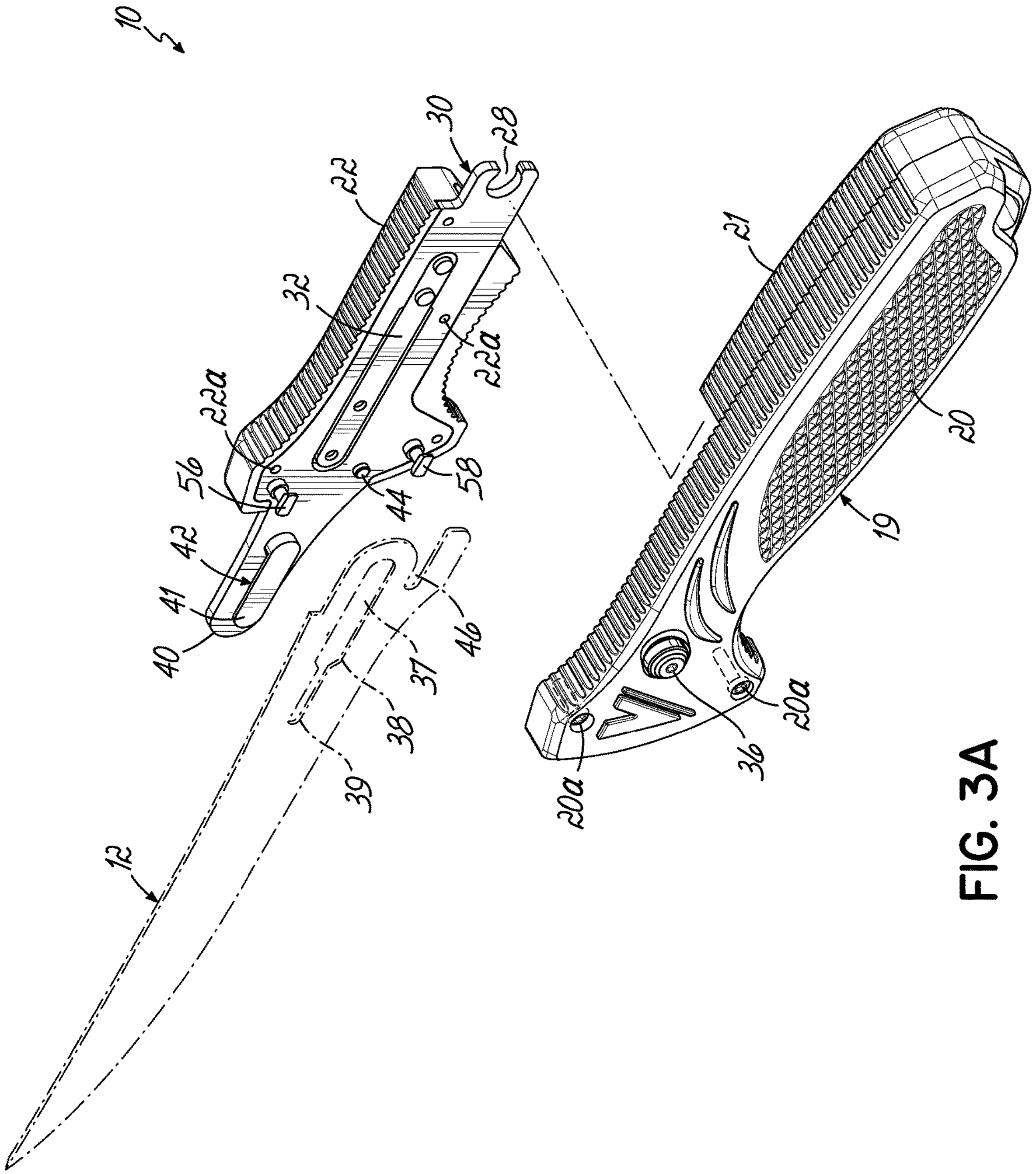
FIG. 3A is a view similar to FIG. 2 with the liner plate and the lock lever attached to the first portion of the handle, the fitment plate attached to the second portion of the handle, and the second portion of the handle shown removed from the first portion of the handle.
Figure 3B:
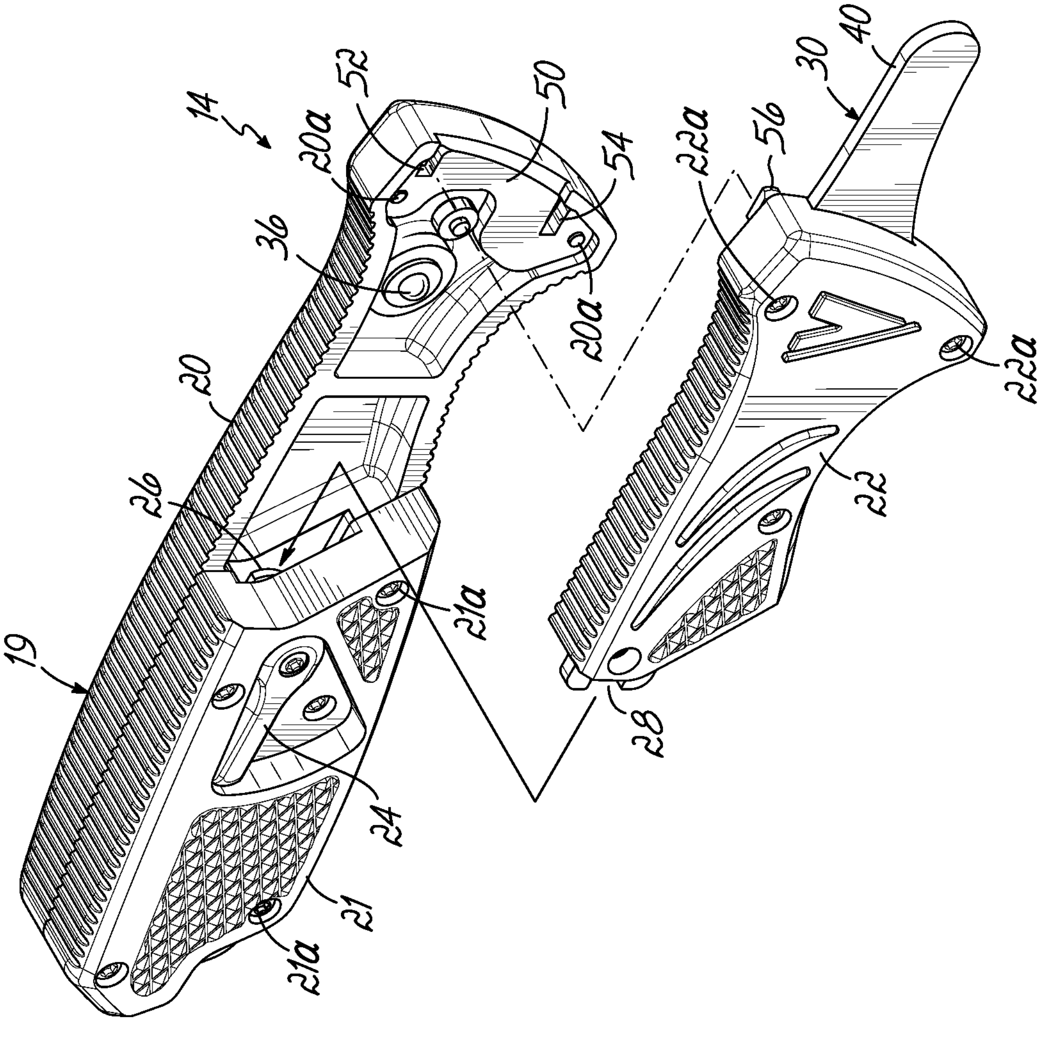
FIG. 3B is a view similar to FIG. 3A except that the view is a front top left perspective view.
Figure 4:
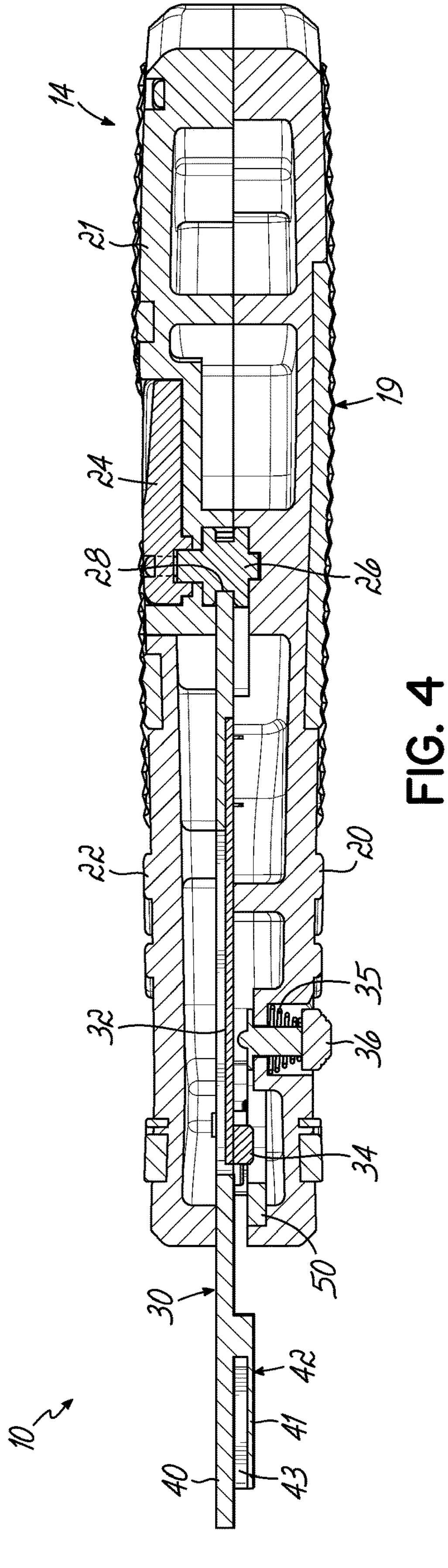
FIG. 4 is a top cross-sectional view of the knife blade and knife handle.
Figure 5A:
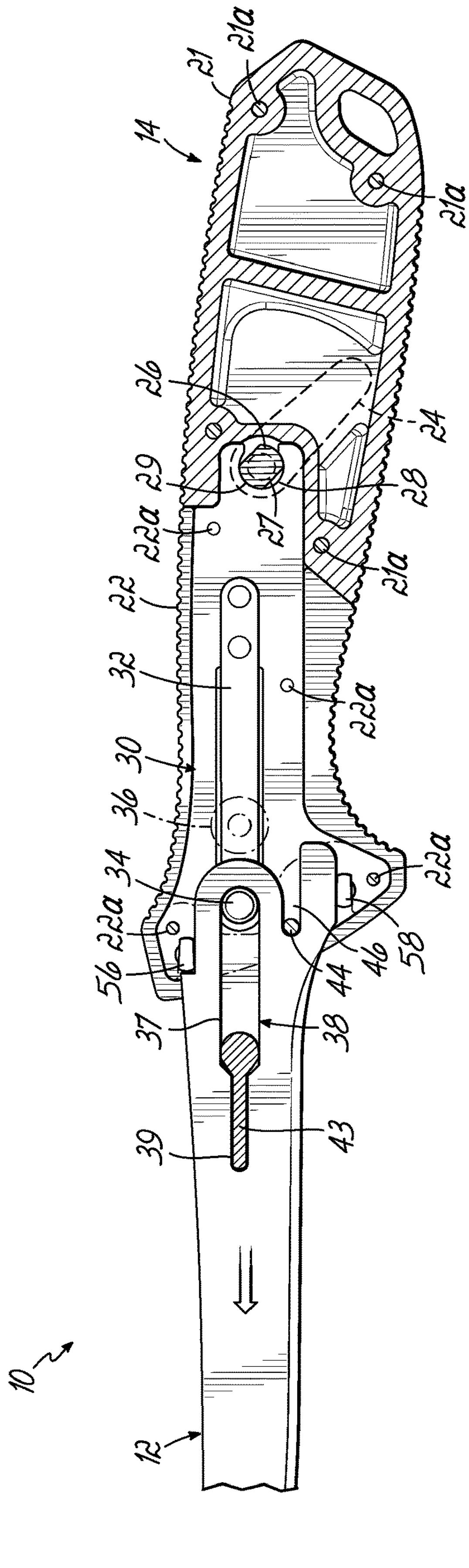
FIG. 5A is a right side cross-sectional view of the knife blade installed in the knife handle.
Figure 5B:
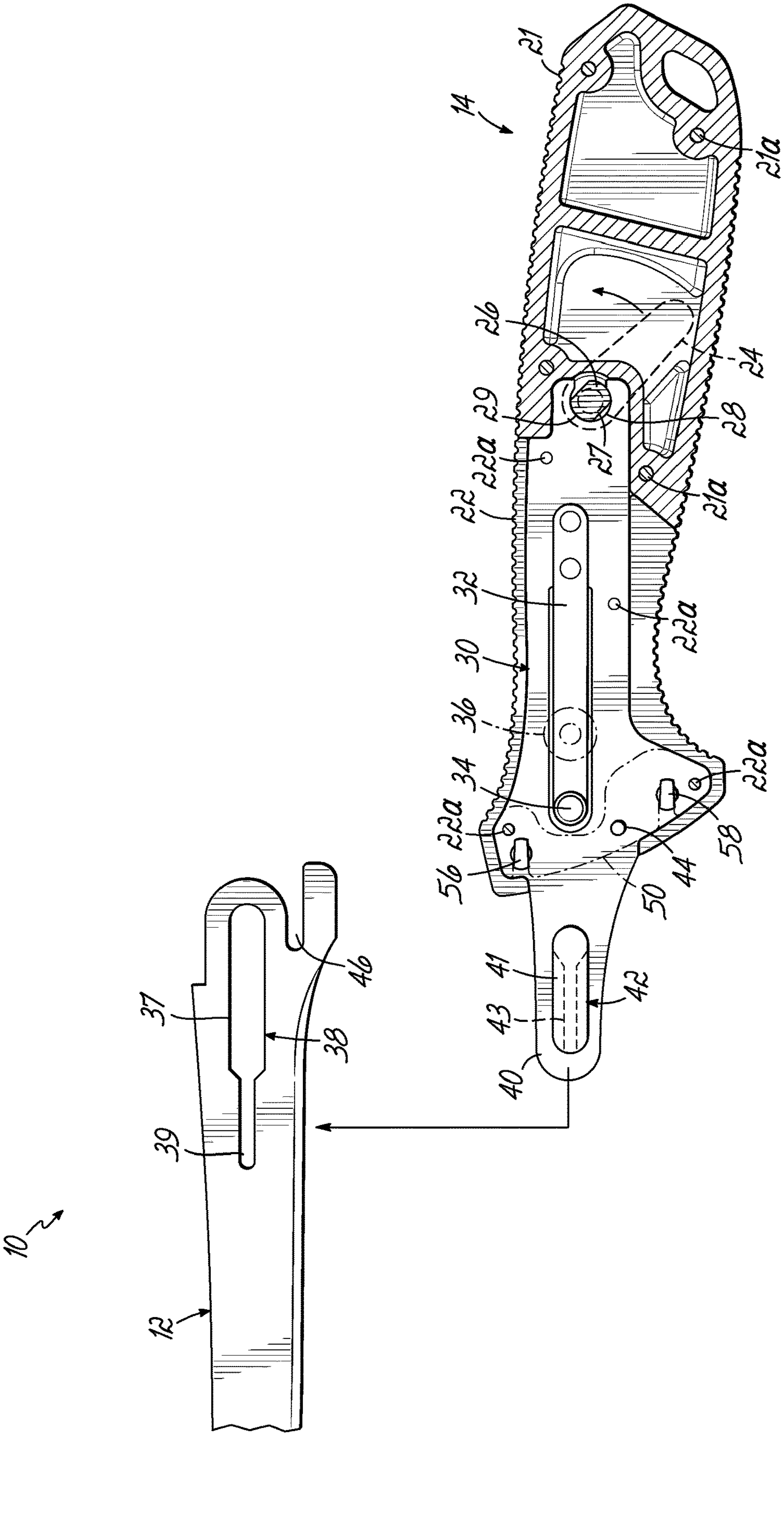
FIG. 5B is a view similar to FIG. 5A with the knife blade shown removed from the knife handle.
Figure 5C:
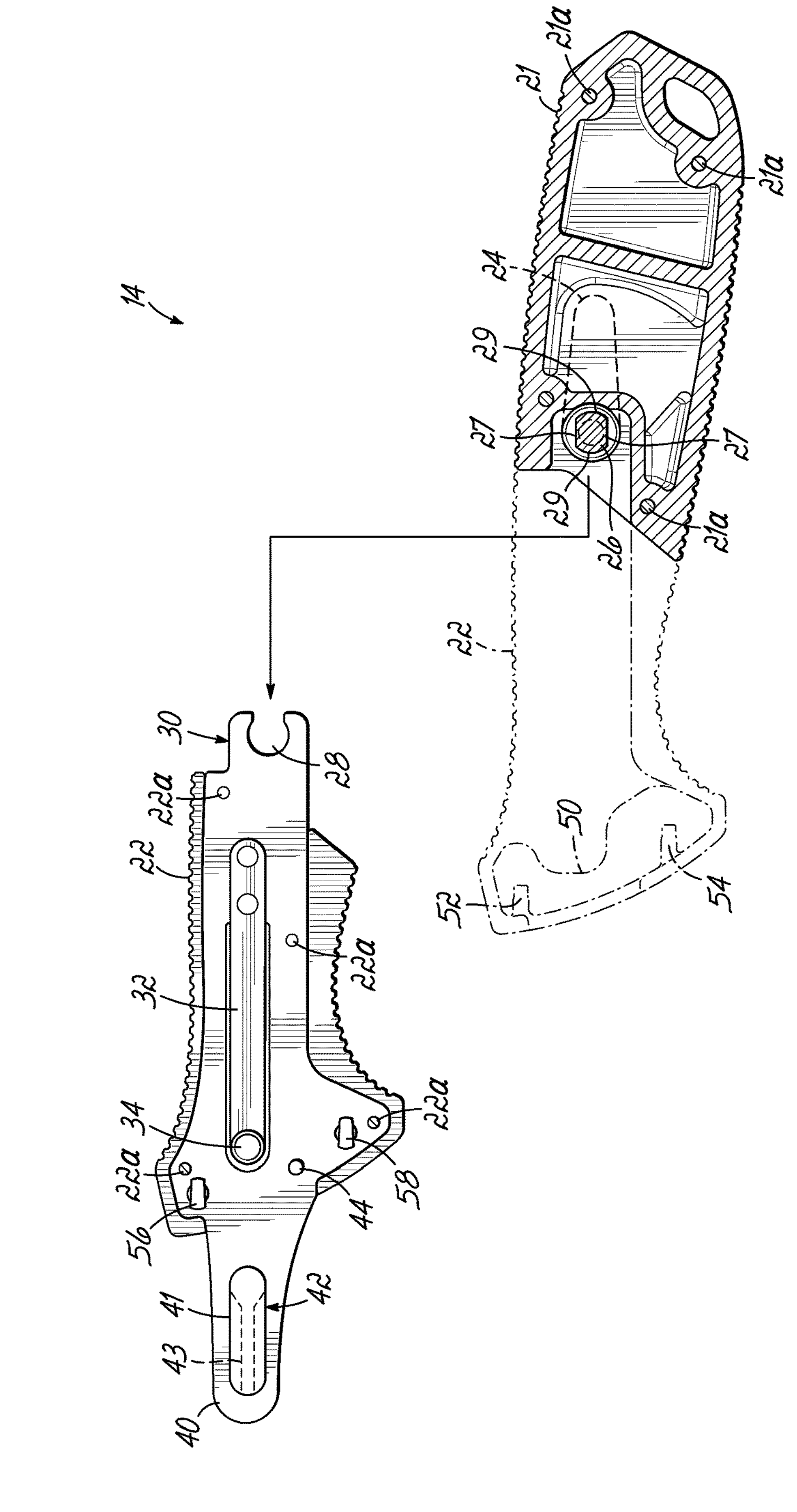
FIG. 5C is a view similar to FIG. 5B showing the second portion of the knife handle removed from the first portion of the knife handle.

Referring first to FIG. 1, there is illustrated a knife 10 forming a part of the cutlery system of the present invention. The knife 10 has a blade 12 (a filet blade in these figures) and a handle 14.

Referring to FIGS. 2-5C, handle 14 has a first portion 19, a second portion 21, and a third portion 22. First portion 19 forms a left-hand half of handle 14, whereas second and third portions 21, 22 combine to form a right-hand half of handle 14. Screws 21*a* secure handle second portion 21 to handle first portion 19. Handle portion 22 can be removed from handle portion 19 for cleaning and the like, as described below. Handle portions 19, 21, and 22 can be fabricated of, for example, injection molded nylon, and can include various decorative and/or grip inserts epoxy bonded thereto. The second handle portion 21 has a pivoting locking lever 24 fabricated of, for example, injection molded nylon. Locking lever 24 carries a lever lock 26 fabricated of, for example, stainless steel. Locking lever 24 rotates in a relief area on an outerside of handle second portion 21. See FIG. 3B. Locking lever 24 rotates the lever lock 26 in a semi-circular, greater than 180 degrees, notch 28 of a fitment plate 30 fabricated of, for example, stainless steel. Fitment plate 30 is screwed to the third handle portion 22 with screws 22*a*. Rotation of locking lever 24 rotates lever lock 26 to lock and unlock the third handle portion 22 to and from, respectively, the first handle portion 19. The lever lock 26 has a pair of opposed straight sides 27 and a pair of opposed semi-circular sides 29. When the straight sides 27 are oriented generally parallel to the longitudinal axis of the fitment plate 30, the lever lock 26 can be completely received in notch 28. Once received in the notch 28, the lever lock 26 can be rotated by locking lever 24 to lock the third handle portion 22 to the first handle portion 19. See FIGS. 5B and 5C.

Fitment plate 30 has a spring 32 screwed thereto and is fabricated of, for example, stainless steel, and is in the form of a cantilever beam or leaf spring. Spring 32 has a spring stud 34 that cooperates with a release button 36. Release button 36 is biased away from, i.e. out of contact with, leaf spring 32 via a compression spring 35. Knife blade 12 has an elongated slot 38 in a proximal end thereof. The slot 38 has a wider proximal portion 37 and a narrower distal portion 39. The fitment plate 30 has an extension 40 that extends or projects outwardly from a distal end of the handle 14. The extension 40 has an elongated oval protuberance, nub, or lug 42 that is closely and slidably received in the slot 38. More particularly, the protuberance 42 includes a first portion 41 which can pass through the wider proximal portion 37 of the slot 38 but which cannot pass through the narrower distal portion 39 of the slot 38, and a second portion 43, narrower than the first portion 41, that connects the first portion 41 to the plate 30 and which is closely and slidably received in the narrower distal portion 39 of the slot 38. The fitment plate 30 has a fitment stud 44 fabricated of, for example, stainless steel, that is received in a recess 46 in blade 12.

Portion 20 of first handle portion 19 of handle 14 has a liner plate 50 fabricated of, for example, stainless steel, screwed to it at a distal end thereof with screws **20*a*. Liner plate 50 has notches 52, 54 that receive tangs 56, 58, respectively, on fitment plate 30. The lever lock 26, notch 28, tangs 56, 58, and notches 52, 54 serve to securely removably attach second portion 22 of handle 14 to first portion 19 of handle 14**.

To attach the blade 12 to the handle 14, handle portion 22 is slid into/onto handle portion 19 and locked via the locking lever 24. Next, the proximal end of the blade 12 is inserted into the distal end of the handle 14. Sliding the proximal end of the blade 12 into the handle 14 while pressing the release button 36 to deflect the spring 32 permits the blade 12 to be fully inserted into the handle 14. Once the proximal end of the elongated slot 38 clears the spring stud 34, the release button 36 can be released, whereupon the spring 32 biases the spring stud 34 into the elongated slot 38. At this time the fitment stud 44 is firmly received in the recess 46 of the blade 12, and the distal end of the lug 42 is firmly received in the distal end of the elongated slot 38, namely the distal end of portion 43 of lug 42 is firmly received in the distal end of portion 39 of slot 38.

To detach the blade 12 from the handle 14, the release button 36 is pressed which deflects the spring 32 and thereby moves the spring stud 34 out of the elongated slot 38 in the blade 12. At this time the proximal end of said blade 12 can be slid out of the handle 14 to thereby detach the blade 12 from said handle 14.

Several blades can be used to form the cutlery system of the invention. For example, the system can include blades such as filet knife blades, clip or clip point knife blades, gut hook knife blades, and saw blades, including a plurality of lengths of each.

Figure 6:
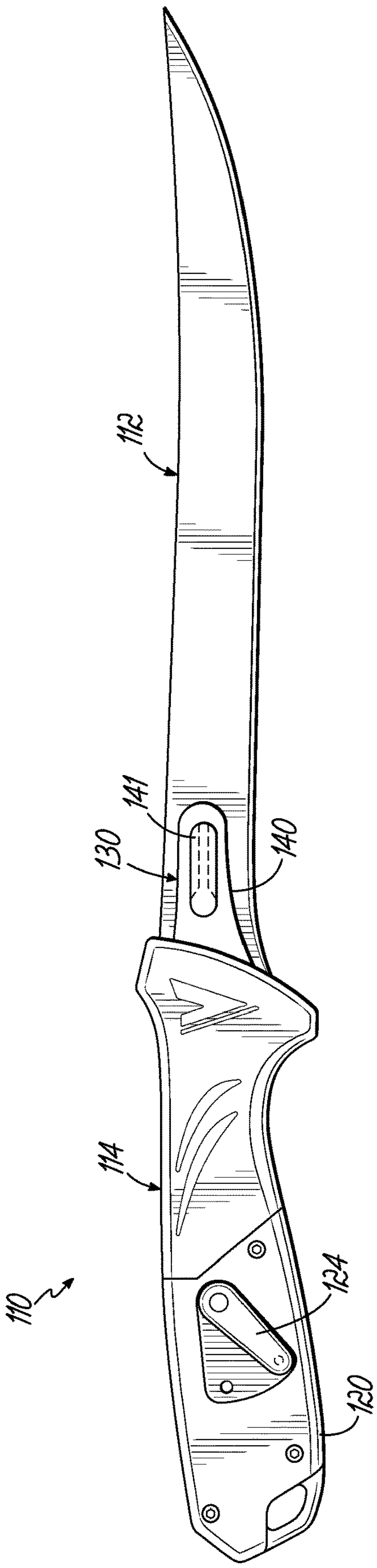
FIG. 6 is a left side view of another embodiment of knife according to the invention.
Figure 7:
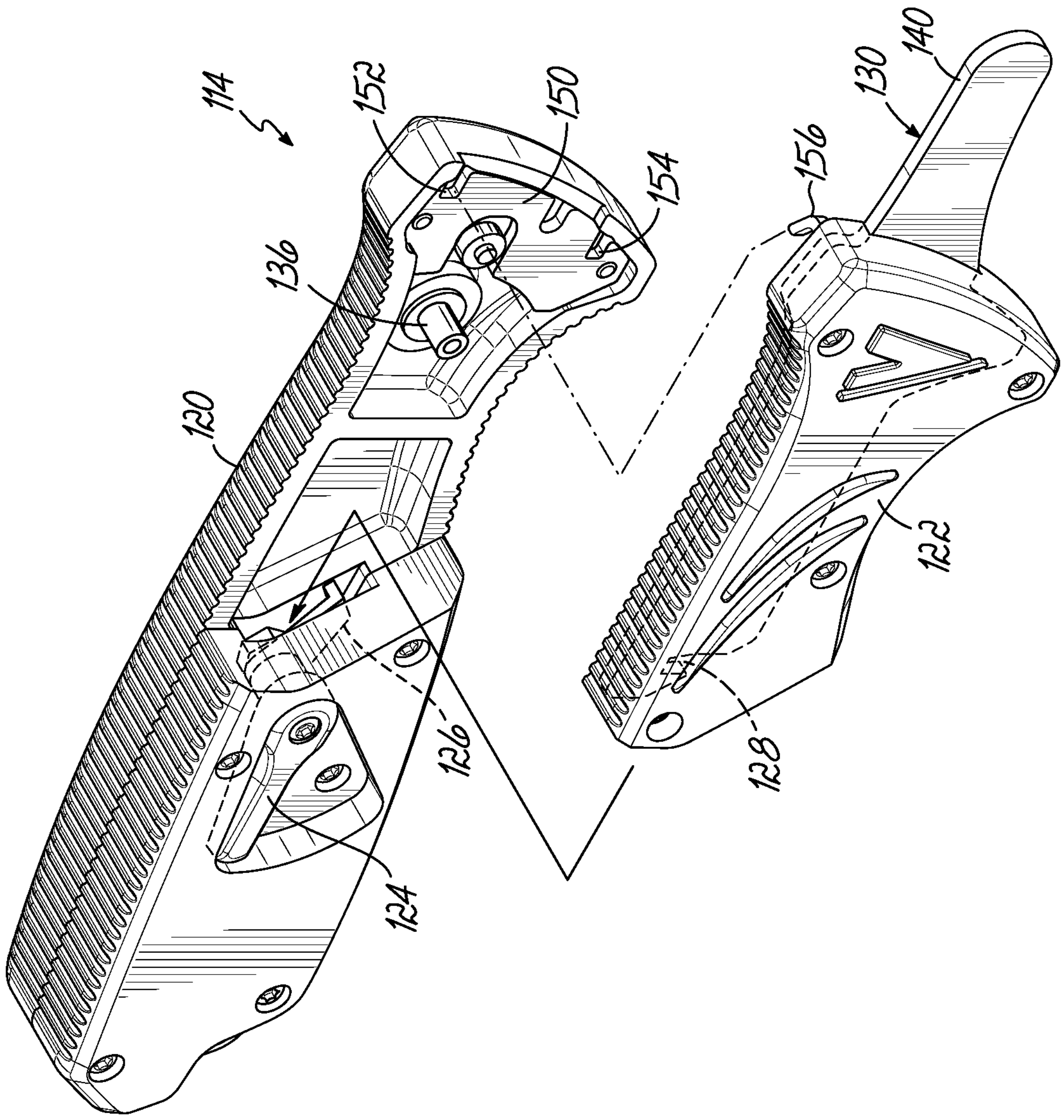
FIG. 7 is a front top left perspective view of the knife of FIG. 6 with the liner plate and the lock lever attached to the first portion of the handle, the fitment plate attached to the second portion of the handle, and the second portion of the handle shown removed from the first portion of the handle.
Figure 8:
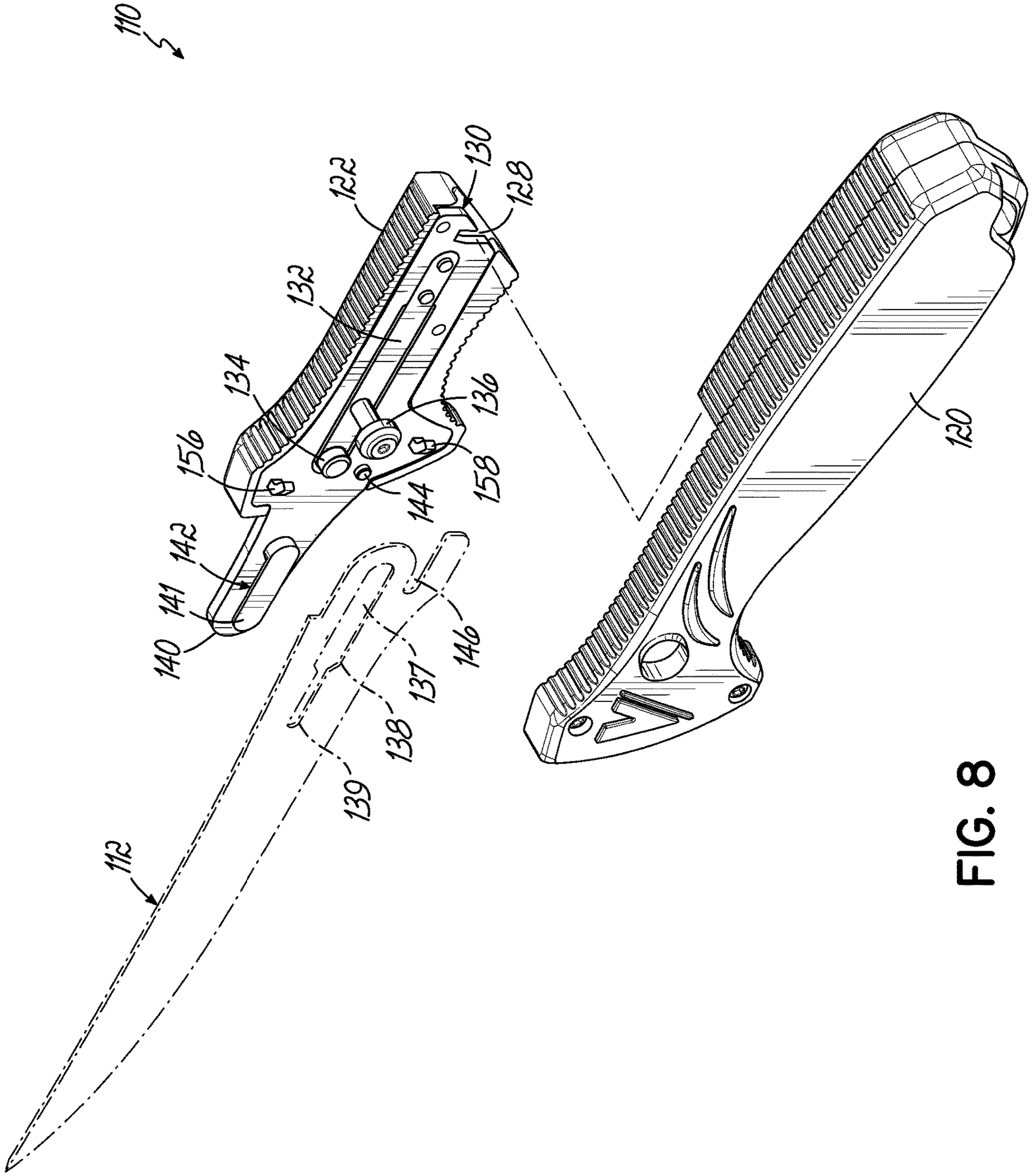
FIG. 8 is a rear top right perspective view of the knife of FIG. 6 with the liner plate and the lock lever attached to the first portion of the handle, the fitment plate attached to the second portion of the handle, and the second portion of the handle shown removed from the first portion of the handle.
Figure 9:
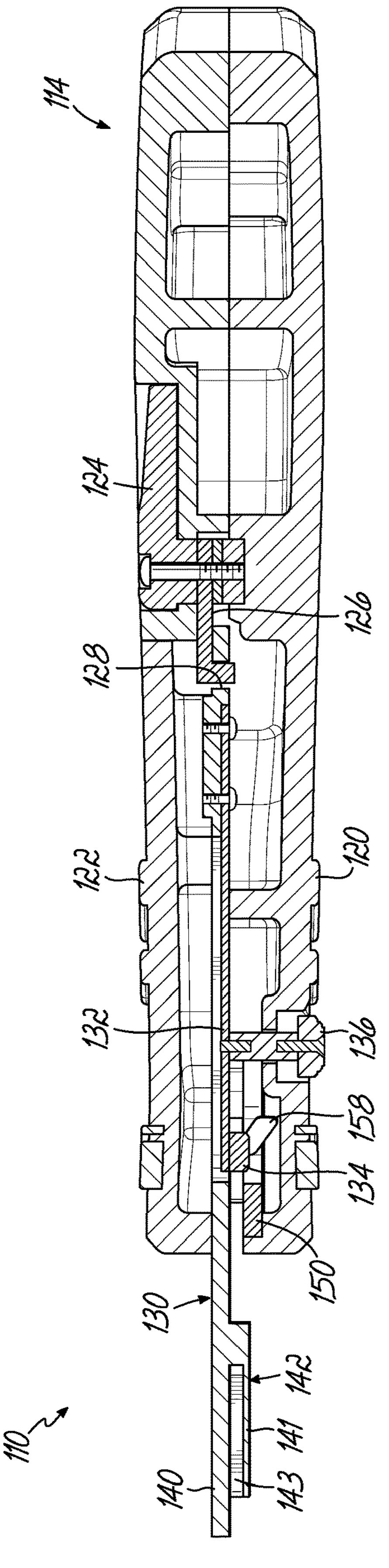
FIG. 9 is a top cross-sectional view of the knife blade and knife handle of FIG. 6.
Figure 10A:
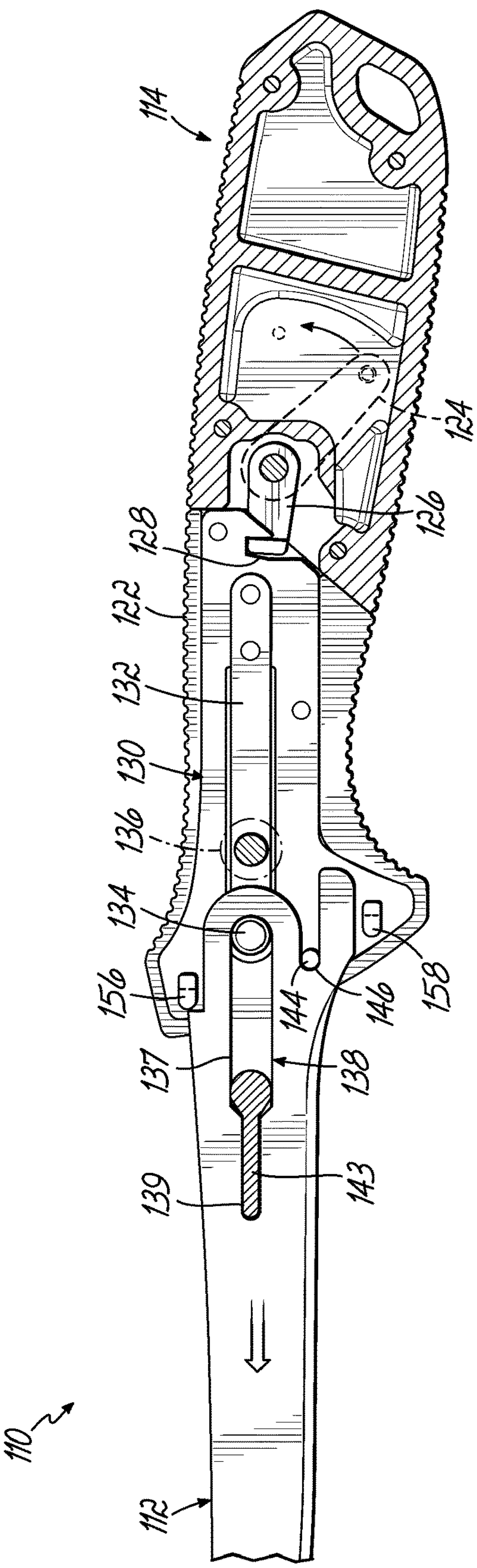
FIG. 10A is a right side partial cross-sectional view of the knife blade and knife handle of FIG. 6.
Figure 10B:
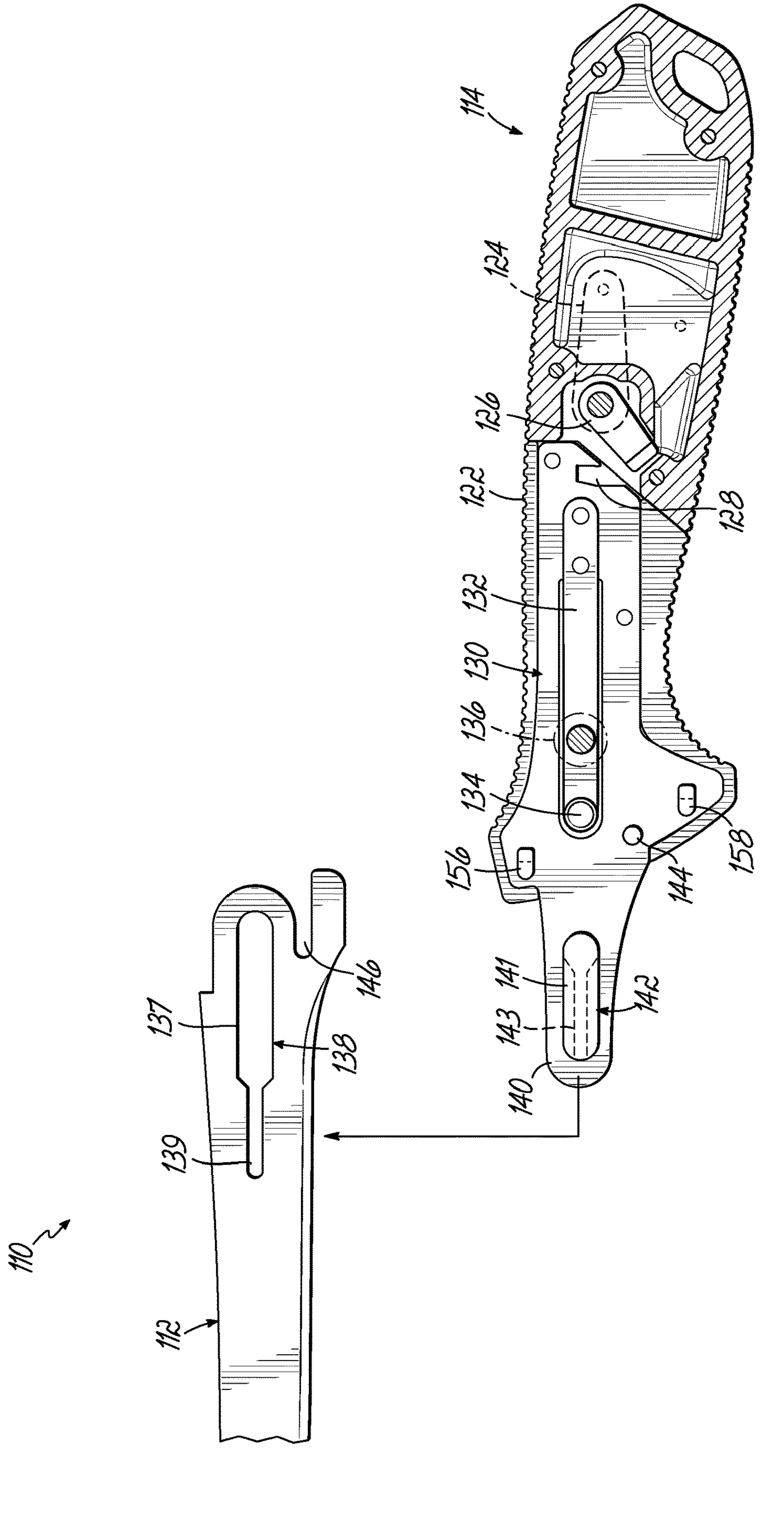
FIG. 10B is a view similar to FIG. 10A with the knife blade removed.
Figure 10C:
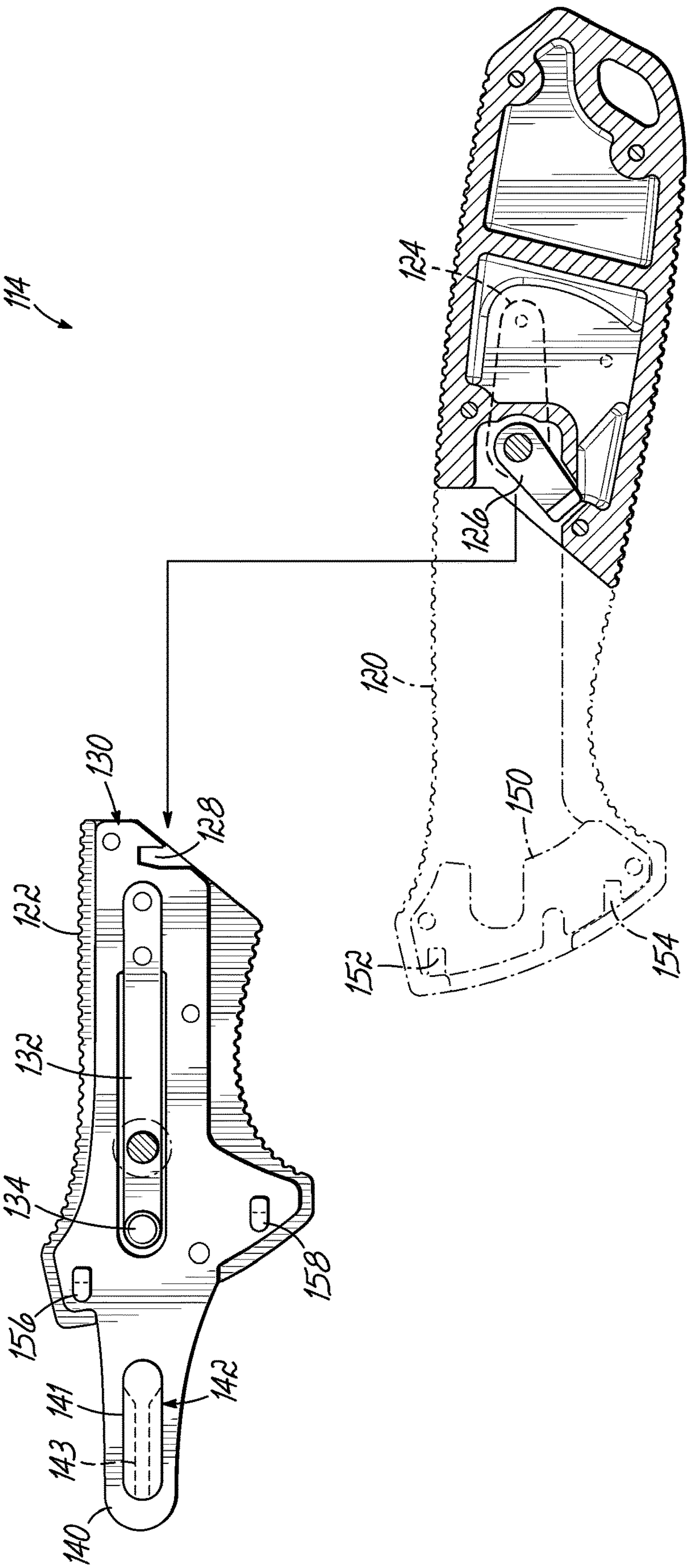
FIG. 10C is a view similar to FIG. 10B with certain details omitted for clarity.

Referring now to FIG. 6, there is illustrated another knife 110 forming a part of the cutlery system of the present invention. The knife 110 has a blade 112 (a fillet blade in these figures) and a handle 114.

Referring to FIGS. 7-10C, handle 114 has a first portion 120 and a second portion 122 removably secured to the first portion 120. Handle portions 120 and 122 can be fabricated of, for example, injection molded nylon, and can include various decorative and/or grip inserts epoxy bonded thereto. The first portion 120 has a pivoting locking lever 124 fabricated of, for example, injection molded nylon, that carries a lever lock 126 fabricated of, for example, stainless steel, that moves into and out of a notch 128 of a fitment plate 130 fabricated of, for example, stainless steel, screwed to the second portion 122, to lock and unlock the second portion 122 to and from, respectively, the first portion 120.

Fitment plate 130 has a spring 132 screwed thereto and is fabricated of, for example, stainless steel, and is in the form of a cantilever beam. Spring 132 has a spring stud 134 and a release button 136. Knife blade 112 has an elongated slot 138 in a proximal end thereof. The slot 138 has a wider proximal portion 137 and a narrower distal portion 139. The fitment plate 130 has an extension 140 that extends or projects outwardly from a distal end of the handle 114. The extension 140 has an elongated oval protuberance, nub, or lug 142 that is closely and slidably received in the slot 138. More particularly, the protuberance 142 includes a first portion 141 which can pass through the wider proximal portion 137 of the slot 138 but which cannot pass through the narrower distal portion 139 of the slot 138, and a second portion 143, narrower than the first portion 141, that connects the first portion 141 to the plate 130 and which is closely and slidably received in the narrower distal portion 139 of the slot 138. The fitment plate 130 has a fitment stud 144 fabricated of, for example, stainless steel, that is received in a recess 146 in blade 112.

First portion 120 of handle 114 has a liner plate 150 fabricated of, for example, stainless steel, screwed to it at a distal end thereof. Liner plate 150 has notches 152, 154 that receive tangs 156, 158, respectively, on fitment plate 130. The lever lock 126, notch 128, tangs 156, 158, and notches 152, 154 serve to securely removably attach second portion 122 of handle 114 to first portion 120 of handle 114.

To attach the blade 112 to the handle 114, the proximal end of the blade 112 is inserted into the distal end of the handle 114. The spring 132 is deflected by virtue of the proximal end of the blade 112 acting upon the spring stud 134, and/or by pressing the release button 136. Insertion of the blade 112 into the handle 114 continues until such time as the proximal end of the elongated slot 138 clears the spring stud 134, whereupon the spring 132 biases the spring stud 134 into the elongated slot 138. At this time the fitment stud 144 is firmly received in the recess 146 of the blade 112, and the distal end of the lug 142 is firmly received in the distal end of the elongated slot 138.

To detach the blade 112 from the handle 114, the release button 136 is pressed which deflects the spring 132 and thereby moves the spring stud 134 out of the elongated slot 138 in the blade 112. At this time the proximal end of said blade 112 can be slid out of the handle 114 to thereby detach the blade 112 from said handle 114.

Figure 11:
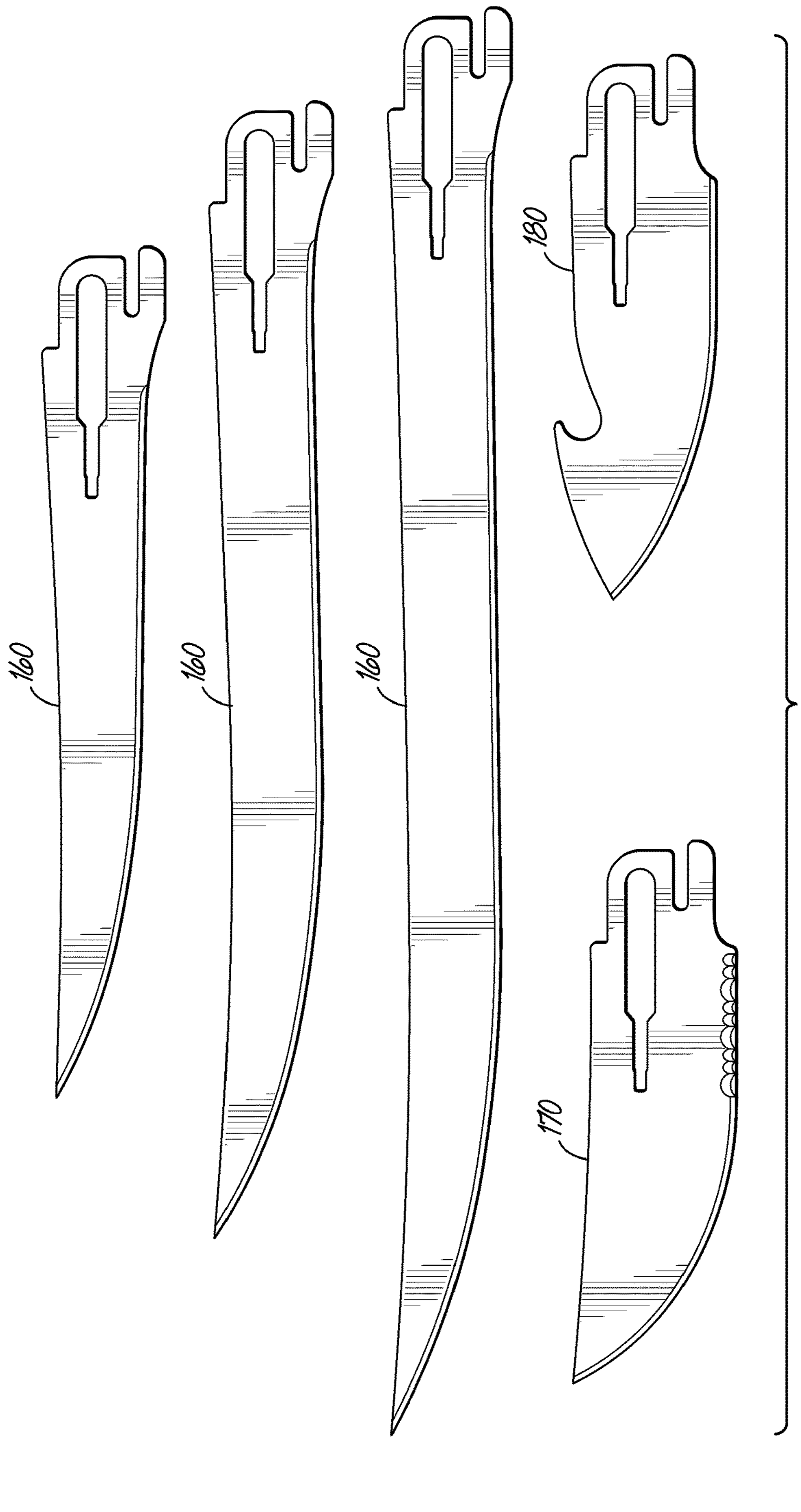
FIG. 11 is a right side view of various blades usable with the invention.

FIG. 11 illustrates several knife blades that can be used to form the cutlery system of the invention. For example, the system can include filet blades 160, clip or clip point blades 170, and gut hook blades 180, and including a plurality of lengths of each.

Figure 12:
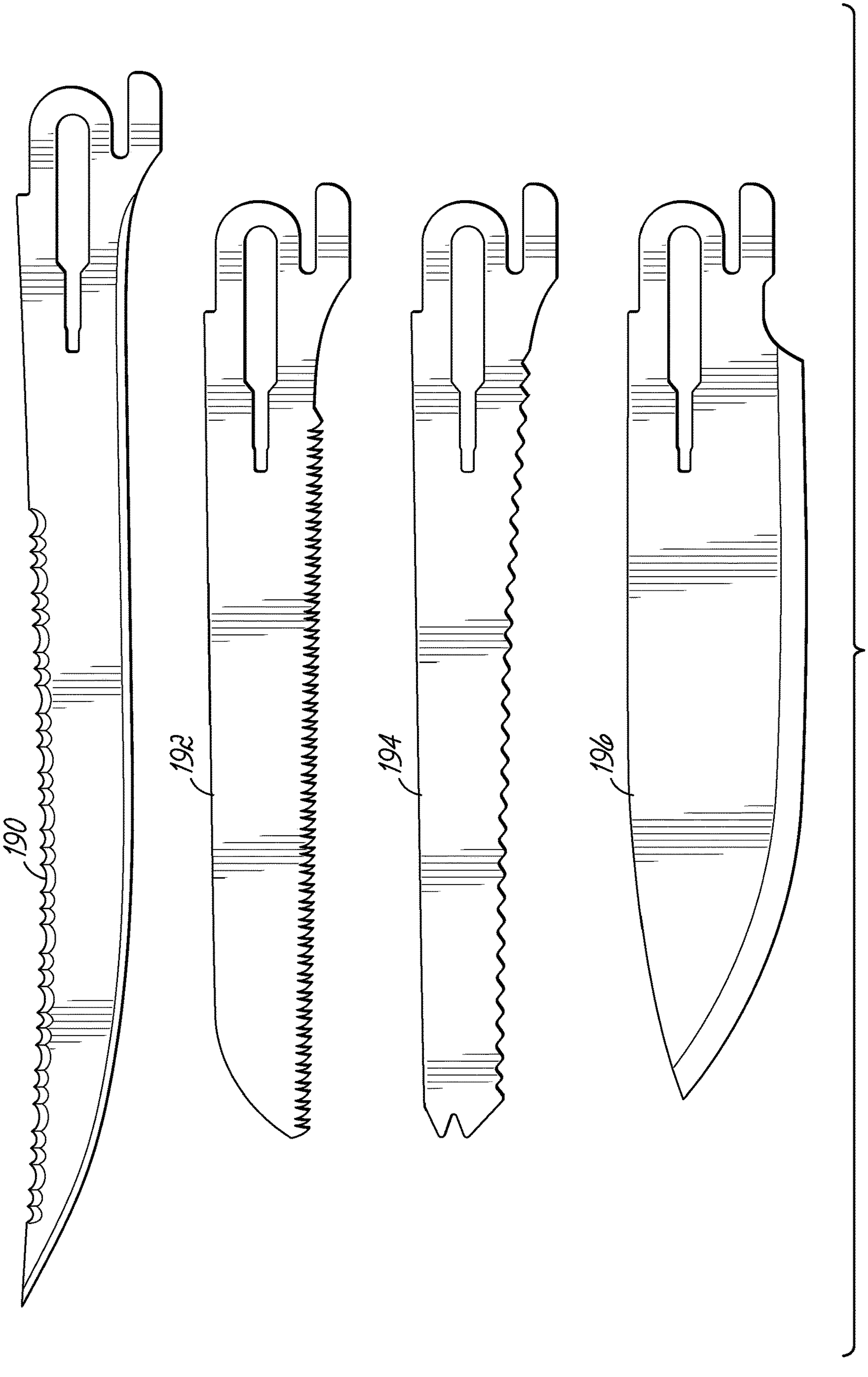
FIG. 12 is a right side view of various additional blades usable with the invention.

The cutlery system of the present invention is a platform whereby numerous blade styles and tools can be utilized. Other implements that can be utilized with this system are fish scalers 194, back-serrated fillet blades 190, large bush craft blades 196, saws 192, etc., as shown in FIG. 12. The implements shown in FIG. 12 are well known in the art.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

What is claimed is:

1. A bladed implement, comprising:
- a blade handle,
- a blade fitment plate, a first portion of said plate mounted in said handle and a second portion of said plate extending out of a distal end of said handle,
- a spring mounted to said first portion of said fitment plate and deflectable generally perpendicular to a plane defined by a longitudinal axis of said handle,
- a spring stud mounted on said spring,
- a release button mounted to said handle and operable to engage said spring, and a blade including an aperture in a proximal end of said blade, wherein said aperture is an elongated slot and wherein said second portion of said plate includes an elongated protuberance which is closely and slidably received in said elongated slot, wherein sliding said proximal end of said blade into said handle while pressing said release button to deflect said spring permits said blade to be inserted into said handle, whereupon releasing said release button once said aperture is aligned with said spring stud allows said spring to bias said spring stud into said aperture to attach said blade to said handle, and wherein pressing said release button deflects said spring thereby moving said spring stud out of said aperture at which time said proximal end of said blade can be slid out of said handle to thereby detach said blade from said handle.

2. The implement of claim 1 wherein said slot includes a proximal portion and a distal portion, the proximal portion being wider than said distal portion, and wherein said protuberance includes a first portion which can pass through said proximal portion of said slot but which cannot pass through said distal portion of said slot, and wherein said protuberance includes a second portion, narrower than said first portion, that connects said first portion to said plate and which is closely and slidably received in said distal portion of said slot.

3. The implement of claim 1 wherein said proximal end of said blade further includes a recess therein spaced transversely from said elongated slot within a plane defined by said blade and wherein said plate further includes a fitment stud which is received in said recess when said blade is attached to said handle.

4. The implement of claim 3 wherein said spring is a cantilever beam secured to said plate at a proximal end of said cantilever beam and wherein said spring stud is mounted to said beam at a distal end of said beam, and wherein said release button is mounted to said beam between said proximal end of said beam and said spring stud.

5. The implement of claim 1 wherein said blade is selected from a group consisting of a fillet knife blade, a back-serrated fillet knife blade, a clip point knife blade, a gut hook knife blade, a saw blade, a fish scaler, a bush craft blade, and multiple lengths of each version of said blades.

6. The implement of claim 1 wherein said handle includes a first portion and a second portion removably attached to said first portion, wherein said fitment plate is secured to said second portion, and wherein said first portion includes a lock lever that engages said fitment plate for locking said second portion to said first portion.

7. A knife, comprising:

a knife handle, a blade fitment plate, a first portion of said plate mounted in said handle and a second portion of said plate extending out of a distal end of said handle, a spring mounted to said first portion of said fitment plate and deflectable generally perpendicular to a plane defined by a longitudinal axis of said handle, a spring stud mounted on said spring, a release button mounted to said handle and operable to engage said spring, and a knife blade including an aperture in a proximal end of said blade, wherein said aperture is an elongated slot and wherein said second portion of said plate includes an elongated protuberance which is closely and slidably received in said elongated slot, wherein sliding said proximal end of said blade into said handle deflects said spring by virtue of said blade acting upon said spring stud, or pressing said release button deflects said spring, until such time as said aperture is aligned with said spring stud whereupon said spring biases said spring stud into said aperture to attach said blade to said handle, and wherein pressing said release button deflects said spring thereby moving said spring stud out of said aperture at which time said proximal end of said blade can be slid out of said handle to thereby detach said blade from said handle.

8. The knife of claim 7 wherein said proximal end of said blade further includes a recess therein spaced transversely from said elongated slot within a plane defined by said blade and wherein said plate further includes a fitment stud which is received in said recess when said blade is attached to said handle.

9. The knife of claim 8 wherein said spring is a cantilever beam secured to said plate at a proximal end of said cantilever beam and wherein said spring stud is mounted to said beam at a distal end of said beam, and wherein said release button is mounted to said beam between said proximal end of said beam and said spring stud.

10. The knife of claim 7 wherein said blade is selected from a group consisting of fillet, clip, and gut hook blades.

11. The knife of claim 7 wherein said handle includes a first portion and a second portion removably attached to said first portion, wherein said fitment plate is secured to said second portion, and wherein said first portion includes a lock lever that engages said fitment plate for locking said second portion to said first portion.

* * * * *